Nov. 14, 1961   J. S. COURTNEY-PRATT ET AL   3,008,773
BEARINGS OF REDUCED FRICTION AND FATIGUE
Filed Dec. 21, 1959

INVENTORS  J. S. COURTNEY-PRATT
           W. P. MASON
BY
          H. O. Wright
                ATTORNEY 3,008,773
BEARINGS OF REDUCED FRICTION
AND FATIGUE
Jeofry S. Courtney-Pratt, Springfield, and Warren P. Mason, West Orange, N.J., assignors to Bell Telephone Laboratories, Incorporated, New York, N.Y., a corporation of New York
Filed Dec. 21, 1959, Ser. No. 861,005
9 Claims. (Cl. 308—1)

This invention relates to structures for reducing losses and fatigue effects in mechanisms. More particularly, it relates to reducing losses and fatigue effects in mechanisms in which rolling contact only is made between one member and another of the mechanism.

In mechanisms of the prior art it has been found that even though only pure rolling contact is involved and the contacting surfaces in such structures as ball and roller bearings, knife-edge bearings, pivots, gear trains, cam mechanisms and the like are made of materials heretofore considered to possess optimum qualities for the purpose and are constructed with utmost care and precision to avoid mechanical imperfections, and further are lubricated in the most approved manner, there is still an appreciable amount of residual loss sustained. Also, despite optimum operating conditions involving only pure rolling contact as just described, instances of failure due to fatigue effects which may, for example, take form as wear and erosion of the materials at and adjacent to the contacting surfaces are frequently encountered.

In cases where both sliding and rolling contact occurs between two members of a mechanism, the minimum loss and fatigue effects resulting from the sliding contact even under optimum conditions are usually sufficiently greater than the loss and fatigue effects normally resulting from the rolling contact that the latter are often negligible in comparison with the former. Accordingly, the invention is of primary interest only where pure rolling contact is taking place between two elements or members of a mechanism and optimum performance is desired.

It is therefore a principal object of the present invention to virtually eliminate the residual loss between parts of precision mechanisms where one part makes a purely rolling contact with the other while the two parts are in contact and while they are exerting pressure on each other.

It is a further object to eliminate the wear and erosion or fracture which commonly result from fatigue of materials at or adjacent to contacting surfaces in mechanisms of the above-indicated types.

Fracture may, of course, result in the breaking off of flakes from the surface and need not necessarily penetrate deeply beneath the surface.

It has been suggested that the residual loss and the fatigue effects at or adjacent to contacting surfaces of the components of mechanisms of the above-described character may result principally from mechanical hysteresis of the materials of the contacting members. In other words, at any given point of contact the materials deform under the load but as the rolling contact moves on to an adjacent point the energy regained by recuperation of the materials at the immediately prior point is less than the energy required to produce the original deformation at the prior point. The energy loss, of course, is dissipated in the materials as heat and the repeated deformation and recovery of the surface materials involved gives rise to fatigue effects which in turn usually result in wear and erosion or fracture even though no sliding or slipping motion of one surface with respect to the other occurs. Since all materials normally employed in the fabrication of prior art mechanisms were known to be subject to appreciable mechanical hysteresis, it was concluded that the above-described residual loss and hysteresis effects were unavoidable and must be accepted as the normal minimum loss and wear, erosion or fracture it was possible to attain.

The methods and structures of the present invention are based upon the novel concept that contacting surfaces in many mechanisms of the above-enumerated types can be fabricated of materials which are substantially free of mechanical hysteresis. At least two materials, namely silicon and germanium, have been found to have substantially no mechanical hysteresis and to be sufficiently strong mechanically for the uses contemplated. Accordingly, the above objects are realized in accordance with the present invention by the fabrication of the mechanisms so that parts having surfaces of silicon or of germanium are provided at all points in mechanisms of the above-described general types in which one member of such a mechanism is brought into contact with another and one of the contacting members rolls without sliding with respect to the other. A material having no mechanical hysteresis is, furthermore, free from fatigue effects and the resulting wear and erosion or fracture where one contacting member rolls on the other without sliding or slipping thereover. If the materials will withstand the stresses when initially applied, they can be operated for very long periods under the same stresses of purely rolling contact without loss from mechanical hysteresis and with no wear or erosion or fracture resulting from fatigue effects.

The above and other objects, features and advantages of the invention will become apparent from a perusal of the following detailed description of illustrative structures embodying the features of the invention as well as from the appended claims.

Figure 1:
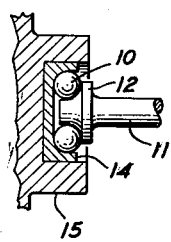
FIG. 1 illustrates a ball bearing assembly embodying the invention.

In more detail in FIG. 1, a conventional form of ball bearing is illustrated and comprises a race which includes an inner portion 12 and an outer portion 14 between which a plurality of balls 10 are interposed. Accordingly, two elements of a mechanism such as a shaft 11 and a fixed member 15 may be attached to the inner and outer portions 12, 14 of the race, respectively, as shown, and one (the shaft) may be rotated with respect to the other causing rotation of the balls 10 interposed between the two portions of the race.

In accordance with the teaching of the prior art, the portions 12, 14 of the race and the balls 10 are preferably made of steel or other hard durable material which can be very accurately fabricated, will resist wear and will offer minimum frictional resistance, particularly if a suitable lubricant is liberally supplied to the balls and the race surfaces with which the balls make contact. While such prior art ball bearings when fabricated with precision and suitably lubricated have for many decades been considered to represent the ultimate in perfection as a low-loss, long lived bearing, difficulties arising from wear and erosion or fracture by flaking of the surfaces of the balls and of the race portions upon which the balls roll are encountered. Also, even the most precisely fabricated and suitably lubricated bearing of this type is not entirely lossless but is subject to an appreciable residual loss even from the first moment it is placed in service.

As described above, this residual loss is a result of mechanical hysteresis of the materials of which the balls and the portions of the race are fabricated.

In accordance with the teaching of the present invention, if the balls 10 and race portions 12 and 14 are fabricated of silicon or of germanium, the residual loss of the resulting ball bearing assembly will be eliminated. Furthermore, if the bearing performs satisfactorily when first placed in service and is maintained in clean condition and appropriately lubricated, it will continue to operate satisfactorily, under the same conditions, for many times the life of a comparable bearing fabricated of the best steel for use in such bearings. In general, lubrication practices for bearings of silicon or germanium can be substantially identical with those which have been found to give the most satisfactory results with steel bearings.

Figure 2:
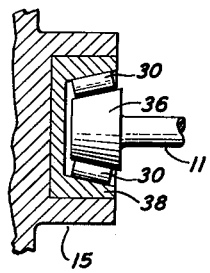
FIG. 2 illustrates a roller bearing assembly embodying the invention.

In FIG. 2 a second conventional form of bearing is illustrated, namely the so-called roller bearing which is similar to the ball bearing of FIG. 1 except that rollers 30 are interposed between the inner portion 36 and the outer portion 38 of the race. In general, this type of bearing is employed in much the same manner as the ball bearing but for arrangements where the load to be carried by the bearing is in excess of the maximum load to which a ball bearing can reasonably be subjected.

In accordance with the present invention, the inner and outer portion of the race and the rollers are fabricated of silicon or germanium and the bearing will then have substantially no residual loss when its parts are made with high precision and are appropriately lubricated. Roller bearings of silicon or germanium will further be free from wear and erosion or fracture and will outlast comparable bearings of the best bearing steel many times over.

Figure 3:
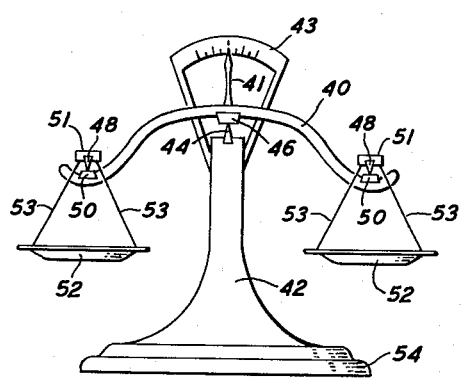
FIG. 3 illustrates a precision balance embodying the invention.

In FIG. 3 a very sensitive balance such as is employed in the precise weighing of chemicals, drugs, precision metals or gems and the like is illustrated. It differs from conventional prior art devices of this type in that the knife-edges 44, 48 and associated anvils 46, 50 are fabricated from silicon or germanium and inserted in key type slots in pedestal 42, yokes 51 and beam 40 of the balance, respectively, as shown. Beam 40 may, for example, carry a pointer 41 which moves adjacent scale 43 supported on pedestal 42. Base 54 obviously supports pedestal 42 in a vertical position, as shown. Pans 52 are suspended by bales 53 from yokes 51. Bales 53 are shown to the left and right to avoid obscuring the knife-edge and anvil. In actual use, however, one would be to the front and the other to the rear of yoke 51. In view of the fact that silicon and germanium have no mechanical hysteresis, as the beam 40 pivots about the contact line of knife-edge 44 with anvil 46, and the yokes 51 at the left and right ends of beam 40 pivot about the contact lines of their associated knife-edges 48 with the corresponding anvils 50, respectively, as shown, no residual loss will tend to impede the motion of the balance during weighing operations. Consequently, the accuracy in weighing operations is increased by use of a balance employing knife-edge anvil type pivots in which both knife-edge and anvil are made of silicon or germanium. Furthermore, such anvils and pivots, if maintained in a clean condition, will not wear or erode or fracture and consequently will operate satisfactorily for much longer periods than those employed in balances of the prior art.

Figure 4:
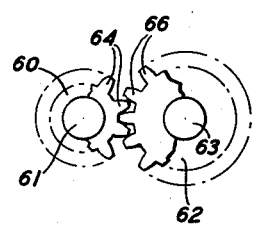
FIG. 4 illustrates a pair of meshing gears embodying the invention.

In FIG. 4 the teeth 64 of a first gear wheel 60 mounted on shaft 61 are illustrated as meshing with teeth 66 of a second gear wheel 62 mounted on shaft 63. The teeth should be cut in one of the several manners well known and extensively used by those skilled in the art so that the surface of each tooth rolls with no slipping or sliding on the surface of the tooth with which it meshes. For small gears each entire gear can be cut from a block of silicon or germanium. For larger gears each of the gears can be made by keying silicon or germanium teeth of suitable contour to the periphery of a steel wheel in much the same manner as the knife-edges 44, 48 and anvils 46, 50 are keyed to the beam and pedestal of the balance of FIG. 3. In accordance with the teaching of the present invention the residual loss for pure rolling contact between the teeth of the two gears will be virtually zero where the teeth are of silicon or germanium. Furthermore, the tooth surfaces will be free from fatigue and erosion or fracture if maintained in a clean condition and appropriately lubricated. (Lubrication practices suitable for comparable steel gears can be followed.) Gears of the invention will consequently serve satisfactorily for many times as long as the normal period of service for the best gears of steel or other commonly used gear metals.

Figure 5:
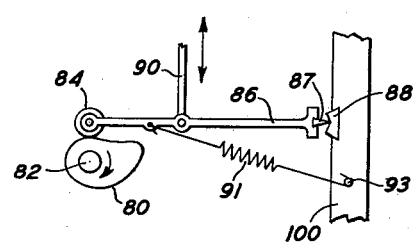
FIG. 5 illustrates a cam mechanism embodying the invention.

In FIG. 5 a further mechanism is illustrated. The mechanism includes a cam 80 mounted on a shaft 82. A roller 84 is mounted on one end of arm 86. A pivot point 87 is keyed to the other end of arm 86. Anvil 88, keyed in fixed member 100, provides a seat in which pivot point 87 can be supported when arm 86 is pulled toward the right and slightly downward by spring 91. Spring 91 is fastened at one end to a point near the left end of arm 86 as shown and at the other end to a stud 93 on fixed member 100. A rod 90 extending vertically from pivot 92 on arm 86 moves vertically as roller 84 follows the surface of cam 80 when the latter is turned by rotation of shaft 82. Rod 90 can, for example, open and close a valve (not shown). Roller 84 and the lower end of rod 90 can, of course, be arranged to turn on ball bearings embodying the principles of the invention if it is desired to avoid residual losses at these points also.

Since pure rotational motion without slipping or sliding is involved between cam 80 and roller 84 and between pivot point 87 and anvil 88, these parts can advantageously, in accordance with the present invention, be fabricated from silicon or germanium and substantially no residual loss will be caused by the rolling contacts between parts 80 and 84 and between parts 87 and 88. Wear and erosion or fracture will also be eliminated if the parts are maintained in a clean condition and appropriately lubricated. Lubrication may be provided as for comparable steel combinations.

In all of the above arrangements, appropriate lubrication of the silicon and/or germanium portions of the mechanisms may also be of value in retarding any tendency toward oxidation which could eventually cause deterioration of the surface of the parts.

In general, substantially pure silicon or germanium in pieces of appropriate size usually can be readily obtained. Silicon is somewhat preferable to germanium on the basis of its overall operating characteristics for many of the purposes of the present invention but germanium will give excellent results.

Numerous and varied other arrangements and modifications of the above-described illustrative embodiments can be readily devised by those skilled in the art without departing from the spirit and scope of the invention.

What is claimed is:

1. A mechanism having a first member and a second member, one member having a pure rolling contact with the other, all portions of each member which come into contact with the other member being fabricated of a material of the class consisting of silicon and germanium.

2. A ball bearing assembly comprising a plurality of balls supported between the portions of a ball race, the balls and the portions of the race being of a material of the class consisting of silicon and germanium.

3. A roller bearing assembly comprising a plurality of rollers supported between the portions of a roller bearing race, the rollers and the portions of the race being of a material of the class which consists of silicon and germanium.

4. A precision mechanism including two members, one supported by the other on a knife-edge support, the knife-edge and the portion of the other member making contact with the knife-edge being of a material of the class consisting of silicon and germanium.

5. A pair of toothed gears supported adjacent each other with the teeth of one gear intermeshing with the teeth of the other gear so that rotation of one gear produces rotation of the other gear, the teeth of each gear being of a material of the class consisting of silicon and germanium.

6. A cam mechanism which includes a cam and a cam following member, the cam following member having a roller thereon which is pressed against the surface of the cam, rotation of the cam producing a predetermined motion of the member, the cam and the roller being of a material of the class consisting of silicon and germanium.

7. A mechanism having a first member and a second member, one member having a pure rolling contact with the other, all portions of each member which come into contact with the other member being fabricated of silicon.

8. A mechanism having a first member and a second member, one member having a pure rolling contact with the other, all portions of each member which come into contact with the other member being fabricated of germanium.

9. A mechanism having a first member and a second member, the first member having a pointed portion about which it is constrained to move the second member having an anvil which includes an indentation adapted to accommodate the pointed portion of the first member, the pointed portion of the first member and the anvil portion of the second member being of a material of the class which includes silicon and germanium.

References Cited in the file of this patent

UNITED STATES PATENTS 1,073,560  Allen _____ Sept. 16, 1913

FOREIGN PATENTS 480,332  Great Britain _____ Feb. 21, 1938